US008953199B2

(12) United States Patent
Kumarahalli Srinivasmurthy et al.

(10) Patent No.: US 8,953,199 B2
(45) Date of Patent: Feb. 10, 2015

(54) METHOD AND SYSTEM TO RECOMMEND AN APPLICATION

(75) Inventors: Venugopal Kumarahalli Srinivasmurthy, Bangalore (IN); Palanikumar Thangapandian, Bangalore (IN); Hiren C. Bhatt, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 415 days.

(21) Appl. No.: 13/017,153

(22) Filed: Jan. 31, 2011

(65) Prior Publication Data

US 2012/0194851 A1 Aug. 2, 2012

(51) Int. Cl.
*G06F 3/12* (2006.01)
(52) U.S. Cl.
USPC .......................................... 358/1.15; 718/100
(58) Field of Classification Search
CPC ................................... G06F 17/30; G06F 8/60
USPC ................. 358/1.15, 403; 359/1.15, 401, 403
See application file for complete search history.

(56) References Cited

U.S. PATENT DOCUMENTS

| | | | |
|---|---|---|---|
| 6,741,262 B1 | 5/2004 | Munson et al. | |
| 6,967,728 B1 | 11/2005 | Vidyanand | |
| 2007/0052994 A1 | 3/2007 | Gullett et al. | |
| 2007/0247660 A1 * | 10/2007 | Nuggehalli | 358/1.15 |
| 2007/0253010 A1 | 11/2007 | Selvaraj | |
| 2008/0137136 A1 | 6/2008 | Shin | |
| 2008/0259884 A1 | 10/2008 | Nguyen | |
| 2009/0051962 A1 | 2/2009 | Asai et al. | |
| 2009/0089811 A1 | 4/2009 | Ferlitsch | |
| 2009/0122343 A1 | 5/2009 | Nishitani | |
| 2009/0276771 A1 | 11/2009 | Nickolov et al. | |
| 2010/0118341 A1 | 5/2010 | Ozawa et al. | |
| 2010/0208294 A1 * | 8/2010 | Nishikawa | 358/1.15 |
| 2011/0090535 A1 * | 4/2011 | Towata | 358/1.15 |
| 2011/0109944 A1 * | 5/2011 | Tanaka | 358/401 |
| 2012/0116559 A1 | 5/2012 | Davis et al. | |

FOREIGN PATENT DOCUMENTS

JP 2003241922 A 8/2003

OTHER PUBLICATIONS

"Internet Printing Protocol (IPP)"; http://datatracker.ietf.org/wg/ipp/charter/; 2 pages.
Harish, et al.; "Web Printing"; U.S. Appl. No. 12/544,223, filed Aug. 20, 2009; 28 pages.
"Internet Printing Protocol (IPP)"; http://datatracker.ietf.org/wg/ipp/charter/; 2 pages, Jan. 25, 2011.

(Continued)

*Primary Examiner* — Benny Q Tieu
*Assistant Examiner* — Juan M Guillermety
(74) *Attorney, Agent, or Firm* — Hewlett-Packard Patent Department; Garry A. Perry

(57) ABSTRACT

In one embodiment, first data pertaining to a software application is obtained at a server system. Second data indicative of capabilities of a web-enabled printer is received at the server system. Third data comprising usage information is received at the server system. An application recommendation is created based at least in part on the first, second, and third data. The recommendation is sent, from the server system and over a web, Internet, or intranet to a receiving destination.

20 Claims, 6 Drawing Sheets

(56) References Cited

OTHER PUBLICATIONS

Harish, et al. "Cloud Printer With a Common User Print Experience"; PCT Application Serial No. PCT/US2010/021442 filed Jan. 20, 2010; 32 pages.

Harish, et al.; "Printer Installation At a Cloud Server" U.S. Appl. No. 12/689,254, filed Jan. 19, 2010; 25 pages.

Harish, et al.; "Web Printing"; U.S. Appl. No. 12/544,223 filed Aug. 20, 2009; 28 pages.

Joseph, Joshy; "Patterns for High Availability, Scalability, and Computing Power with Windows Azure"; May 2009; 10 pages.

* cited by examiner

METHOD AND SYSTEM TO RECOMMEND AN APPLICATION

BACKGROUND

A web-enabled printer is printing device that can receive communications and print jobs via the internet or an intranet. Some web-enabled printers additionally provide a user with the option of downloading and running, or accessing, a web-based software application at the printer (hereinafter a "printer application"). A printer application may allow a user to retrieve desired content from a server external to the web-enabled printer, and then print the content at the user's convenience. Examples of content that may be retrieved utilizing a printer application include news content, coupons, coloring pages for children, puzzles, maps, and greeting cards.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

While selection of a printer application by a user can be relatively straightforward when the set of available printer applications is small, the selection task can be quite complicated when the set is large. Printer manufacturers are developing and making available to users a multitude of printer applications to be run or accessible at web-enabled printers. Further, printer manufacturers are encouraging and enabling third parties to develop and host printer applications to run or be accessible on the web-enabled printers. Some of the applications may be custom printer applications designed to enable a user to print a specific type of content easily. Other printer applications may be used with certain printer models or with printers having a defined set of capabilities.

The plethora of available printer applications presents users with a challenge of learning which printer applications are relevant to the user's needs and available for the user's printer. Embodiments described below were developed in an effort to provide a method and a system to recommend printer applications that consider the nature of the printer application, the capabilities of the web-enabled printer, and usage information relating to the application, content, the user or the printer. In this manner, a printer user may be proactively provided with recommended printer applications. The disclosed method and system are highly useful to a user because of reduced complexity in finding relevant printer applications. Additionally, the printer applications recommendations are dynamic in nature as the recommendations may be updated periodically and progressively. Because the user more easily accesses available relevant printer applications, a user is more likely to utilize the printer applications features of the web-enabled printer and user satisfaction is increased.

The embodiments shown in the accompanying drawings and described below are non-limiting examples. Other embodiments are possible and nothing in the accompanying drawings or in this Detailed Description of Embodiments should be construed to limit the scope of the disclosure, which is defined in the Claims.

The following description is broken into sections. The first, labeled "Environment", describes an example environment in which embodiments may be implemented. The second section, labeled "Components", describes various physical and logical components utilized to implement various embodiments. The third section, labeled as "Operation", describes example embodiments of a method to recommend an application. The fourth section, labeled "Example", describes an example display utilized in recommending a printer application, according to an embodiment of the disclosure.

Figure 1:
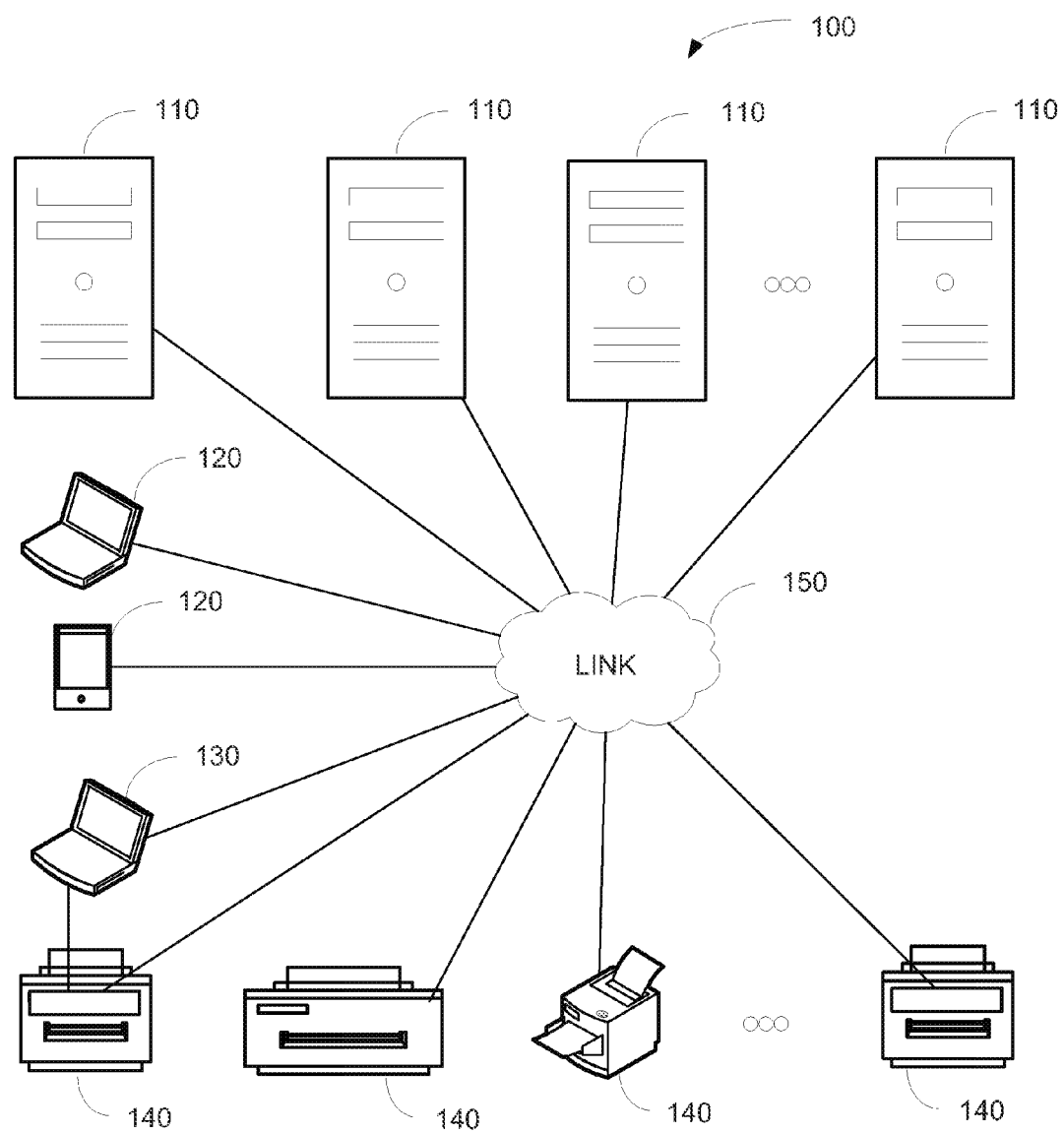
FIG. 1 depicts an example environment in which various embodiments may be implemented.

Environment:

FIG. 1 depicts an example environment 100 in which various embodiments may be implemented. Environment 100 is shown to include servers 110, computing devices 120, a host computing device 130, and web-enabled printers 140.

Each of servers 110 represents generally one or more computing devices capable of receiving and responding to network requests from each other and/or other computing devices via a link 150. Network requests may be sent and received utilizing a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

Computing devices 120 each represent generally any computing device capable of communicating with a server 110 via a network. A computing device 120 may be a desktop computer, a laptop computer, or a mobile computing device. Example mobile computing devices include smart phones, personal digital assistants, net-books, digital media players, and the like.

Web-enabled printers 140 each represent generally an assembly of components configured to produce printed images of media to produce printed output. Web-enabled printers 140, for example, may be used for printing photographs, forms, advertisements, coupons and the like. As used in this specification, "printer" and "printing device" are used synonymously. As used in this specification and the appended claims, a "web-enabled printer" means a printer that can be connected to a web, so as to be capable of obtaining content, sending and receiving messages, and/or running applications via the web. As used in this specification and the appended claims, "web" means the Internet or an intranet. In an embodiment a web-enabled printer 140 may operate in a standalone mode without being connected to a host computing device. In such an example web-enabled printer 140 may be configured to receive print jobs via the Internet, email or an external memory device. In another embodiment printer 140 is connected to a host computing device 130 via a cable or wireless or other means in a manner such that printer 140 may receive instructions and print jobs from the host 130. In another embodiment, web-enabled printer 140 may connect directly to one or more hosts via the Internet or an intranet. In an embodiment, a web enabled printer 140 may be a printer that is not itself connected to the Internet or an intranet, but rather is connected to the web by virtue of being connected, e.g., via a cable or wireless connection, to a host computing device 130 that is connected to the web.

Computing devices 110, 120, 130, and 140 may be interconnected via link 150. Link 150 represents generally one or more of a cable, wireless, fiber optic, or remote connections via a telecommunication link, an infrared link, a radio frequency link, or any other connectors or systems that provide electronic communication. Link 150 may include, at least in part, the Internet, an intranet, or a combination of both. Link 150 may also include intermediate proxies, routers, switches, load balancers, and the like. The paths followed by link 150 between computing devices 110, 120, 130, and 140 as depicted in FIG. 1 represent the logical communication paths between these devices, not necessarily the physical paths between the devices.

Figure 2:
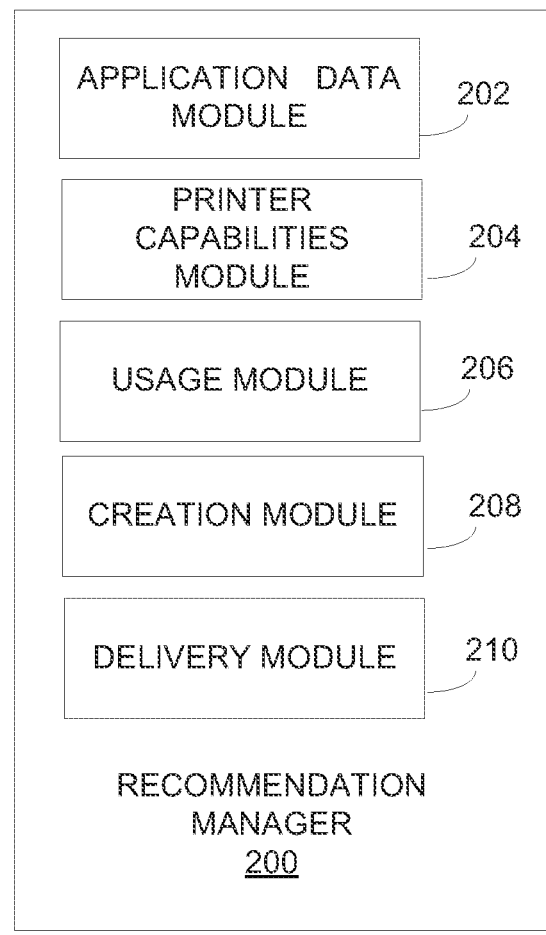
FIG. 2 depicts the physical and logical components of a recommendation manager according to an embodiment.

Components:

FIG. 2 is an example block diagram illustrating the physical and logical components of a recommendation manager 200. Recommendation manager 200 represents generally any combination of hardware and programming configured for use to recommend printer applications. Recommendation manager 200 may be implemented in a number of environments, such as environment 100 of FIG. 1. In the example of FIG. 2, recommendation manager 200 is shown to include an application data module 202, a printer capabilities model 204, a usage module 206, a creation module 208, and a delivery module 210.

Application data module 202 represents generally any combination of hardware and programming configured to obtain, at a server system, data pertaining or relating to a software application accessible at a web-enabled printer. As used in this specification and the appended claims, a "server system" is a system comprising one computing device, or multiple physically distinct computing devices acting in concert. As used in this specification and the appended claims, "accessible at a web-enabled printer" means that the application is available for selection and execution in a manner such that the results of the running of the application are visible to a user of the web-enable printer. In an embodiment, the application is an application that is configured to run at the server system and is displayed at a screen or other display component of the web-enabled printer such that there is an appearance that the application is actually running at the web-enabled printer. In another embodiment, the application is an application that has been downloaded to the web-enabled printer via the network, and which is configured to run at controller of the web-enabled printer and displayed via a screen or other display component of the printer.

In an embodiment, obtaining the data pertaining or relating to the printer application comprises extracting metadata from the application or a related computer file. As used in this specification and the appended claims, "extracting" means to obtain something from a source, and is not limited to a "cut and paste" procedure. For purposes of this disclosure, "extracting", as in "extracting metadata" or "extracting information", is inclusive of copying and other procedures where the extracted item can be used without altering or disturbing the source computer file. As used in this specification and the appended claims, "metadata" means data about data. In the case of metadata relative to a printer application, the metadata is data about the printer application. In an example, the metadata may provide information regarding the content or use of the printer application. A developer of a printer application may provide metadata in the computer file that contains the coding for execution of the printer application. Other developers may provide the metadata in a computer file, e.g., an Extensible Markup Language ("XML") file, that is associated with an executable printer application file. In embodiments, the metadata includes structured information such as an application category, metadata content tags, and/or compatibility with certain printer models. In an example, a developer of a coloring pages printer application may insert into a printer application file content tags such as "Disney®", "coloring pages", "princesses" and/or "Cinderella" to indicate the nature of the printer application and the type of content accessible via that printer application.

In another embodiment, obtaining the data pertaining or relating to the printer application comprises receiving data that is created by a user of the application. In an example, a user may assign printer application-specific descriptive categories or labels to printer applications, in order to organize his or her applications in a highly customized manner. In an example, a user may assign a "Fan", "I Like" or "Cool Stuff" label to a particular printer application, which results in a commensurate metadata tag being added to the printer application file or an associated file. In embodiments, the application data module 202 may obtain the data pertaining to the printer application by extracting a user-created metadata tag from the application file, by extracting the metadata from a computer file associated with the printer application, or by accessing a lookup file that contains user-created metadata for a number of printer applications.

In an embodiment, obtaining the data pertaining or relating to the printer application comprises receiving data from a third party, e.g., a person or entity that is not a developer or a user of the application. Referring back to the coloring pages printer application example discussed previously herein, third party metadata may include descriptive phrases such as "crayon pages", "preschool activities", "fairy tales", and "black and white print". In an embodiment, application data module 202 may obtain the third party data via an XML feed provided by the third party, or by extracting a custom data format within an API for the printer application. Alternatively, the third party data regarding the printer application might be extracted from a lookup file that contains third party-created metadata for a number of printer applications.

In an embodiment, at least a portion of the obtained data pertaining or relating to the printer application comprises information extracted from content within the application, rather than metadata descriptive of the content. As used in this specification and the appended claims, "content" refers to any information that can be received by and stored at a computer system for possible later presentation to a user. Example visual content includes text, graphics, and other images capable of being visually displayed and/or printed at a printing device. Content may also include instructions designed to be processed by a computing device. In an example, receiving data pertaining to or relating to the printer application may include the extraction of key phrases from the content of an application file. Example application file formats may include PDF and other page description formats, HTML, RSS feeds and other XML formats, JPEG, TIFF and other image formats, and document formats such as Microsoft® Word, Microsoft Excel®, and Adobe InDesign®). In some situations, e.g., the extraction of key phrases from a .pdf document, Optical Character Recognition ("OCR") technology may be utilized to render the content searchable.

Printer capabilities module 204 represents generally any combination of hardware and programming configured to receive, at the server system, data indicative of capabilities of the web-enabled printer. Printer capabilities that may or may not be uniform across a set of printers include, but are not limited to, color versus black and white printing, the ability to automatically duplex, job finishing capabilities such as stapling and sorting, display screen resolution, the thumbnail image sizes supported, and the presence of a touchscreen. In an embodiment, data indicative of capabilities of a particular web-enabled printer is received directly from the web-enabled printer via the Internet or an intranet. In another embodiment, the data indicative of capabilities of a printer is received from a computing device distinct from the web-enabled printer, via a network connection. For example, the printer capabilities module 204 may receive the data from a server or other computing device dedicated to providing printer capabilities information for a number of printers. In another example, the printer capabilities module 204 may be configured to retrieve the printer capabilities information from a memory that stores capabilities and specification information for a set of printers. As used in this specification and the appended claims, to "receive" data indicative of capabilities of a printer is inclusive of receiving the data via affirmatively retrieving the data from a computing device or storage component (e.g., receiving via a "pull"), and is also inclusive of receiving the data by virtue of another computing device or storage component having sent the data to the usage module (e.g., receiving via a "push" from the other computing device).

Usage module 206 represents generally any combination of hardware and programming configured to receive, at the server system, data comprising usage information. In an embodiment, the received data is data indicative of usage of a first web-enabled printer for which capabilities data was also received via the printer capabilities module 204. In an embodiment, the received data is indicative of usage of a particular printer application at the first printer, or a particular printer application at a set of printers that are of the same model as the first printer. In embodiments, the received data is indicative of a specific type of content having been accessed by a printer, a group of printers, a user, or a group of users. In an embodiment, the received data is indicative of usage by a specific user of an application, a printer, or of documents containing a particular type of content.

Creation module 208 represents generally any combination of hardware and programming configured to create an application recommendation based at least in part on the application data, printer capabilities data, and usage information data discussed in paragraphs above. In an embodiment, the application, printer capabilities, and usage information data is organized, periodically or on demand, utilizing a data model. Data model possibilities for this task, include, but are not limited to RDF semantic models, rule models, and key phrase models.

Creation model 208 may utilize a query to access the application data, printer capabilities data, and usage information data, and then create the application recommendation based upon the query results. For example, a SPARQL query may be used to access data that has been organized in a RDF semantics model. In another embodiment, in which the data has been organized using a logic-based semantic model, a query predicate may be used to access the information in the model. In another embodiment, in which the data has been organized using a table-like semantic model, a relation query may be used.

In a particular embodiment, a query is constructed utilizing one of the query systems described above and utilized in creating a recommendation for a first user of a web-enabled printer as follows. The creation module 208 is responsible for querying a first database to identify a first set of printer applications most frequently accessed by a user at the printer. The creation module 208 next analyzes the first set of printer applications and identifies metadata associated with the content of such applications. In this example, the creation module 208 next causes a search of a second database (a database of printer applications accessible to the web enabled printer) to identify a second set of applications with metadata indicating that the applications (a) have content similar to that of the first set of frequently used printer applications, and (b) are compatible with the printer. The identified second set of printer applications are deemed "recommended applications" for the web enabled printer.

In another example, a query may be run to search for a first set of printer applications most often-accessed by a particular user. Returning to the coloring pages example discussed previously herein, search results may indicate that a first user frequently utilizes printer applications with "Disney®", "princess", "Cinderella", and "coloring pages" metadata. The metadata also indicates that the first printer is a home/office printer with certain media sizes available. Utilizing this information from the first set of applications, the creation module 208 can intelligently search a database for to identify a second set of printer applications having points of commonality with the first set, and create a list of these applications as a recommendation for the user. Continuing with the coloring page example, the creation module 208 might produce a list of recommended applications for the user that includes recommending applications that (a) have been tagged (e.g., by the developer, by a user, or by a third party) with at least one of the metadata tags "Sleeping Beauty", "Snow White", "DreamWorks®", and "Pixar®", and (b) that can be printed on a media size that is supported by that home/office printer.

Delivery module 210 represents generally any combination of hardware and programming configured to send, from the server system and over a web, the recommendation created by creation module 208 to a receiving destination. The recommendation may be sent over the web utilizing a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP"). In an embodiment, the receiving destination for the recommendation is a web-enabled printer. In an embodiment, the recommendation may be displayed as a list of recommended applications that appears at the control panel, or other display device, of the web-enabled printer after each printing operation. In embodiment, the display could include an audible display made possible via a speaker component. In another embodiment, the recommendation may be sent to a printer application that, when accessed by a user at the printer, presents the recommendation to the user via a visual or other display. This latter procedure may be perceived by some users as being less intrusive than an automatic sending of a printer application recommendation after each print job.

In another embodiment, the receiving destination is a web site accessible to computing device distinct from the web-enabled printer. For example, the delivery module 210 may deliver a printer application recommendation to a web site generally accessible to computing devices via the web and serving as a portal for resources and communications relating to printer applications. An example of such a portal web site is the Hewlett-Packard portal web site "HP ePrinter Center" accessible at http://eprintercenter.com. In an embodiment, the web site may present a printer application recommendation to a user without a requirement of login credentials. In another embodiment, the web site may present a printer application recommendation to a user after the user creates an account at the web site and logs into an account with a valid password.

Figure 3:
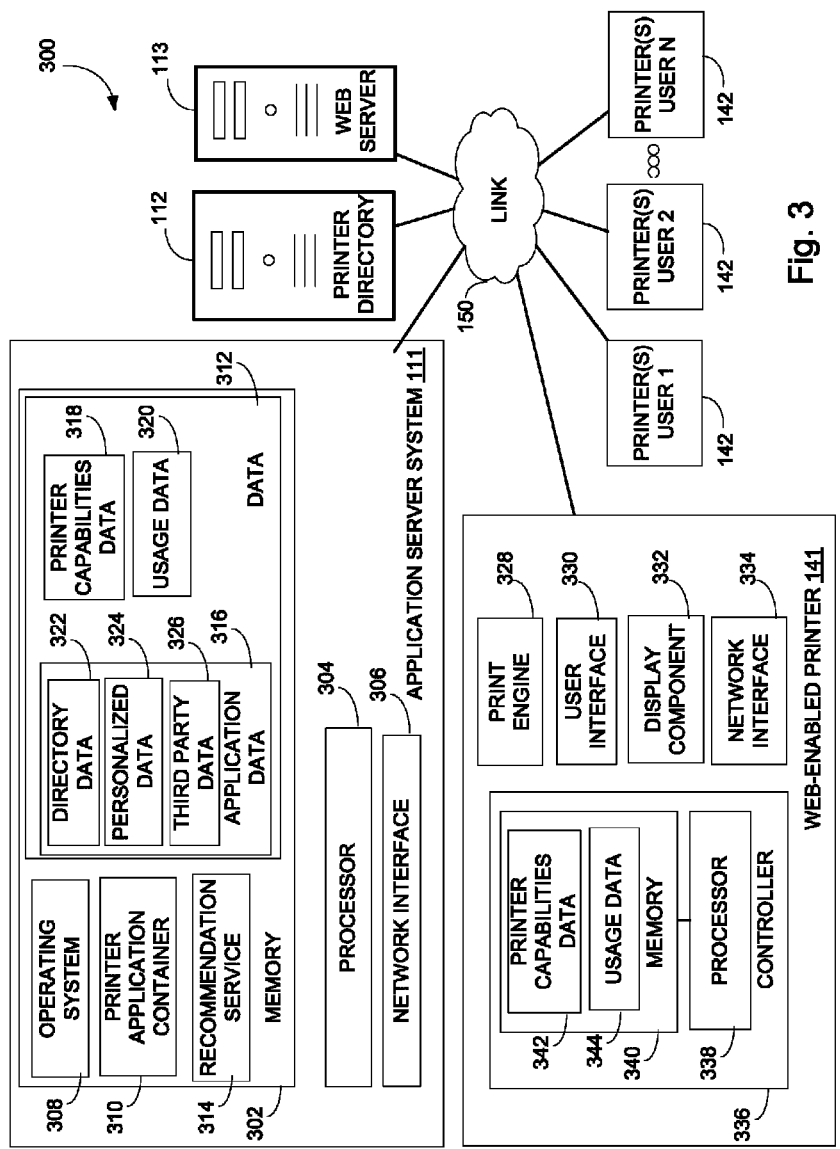
FIG. 3 depicts an example recommendation service according to an embodiment.

Recommendation manager 200 may be implemented in a number of environments, such as environment 300 of FIG. 3. Environment 300 includes a printer application server system 111, a printer directory server 112, a web server 113, a first web-enabled printer 141, and a plurality of other web-enabled printers 142, interconnected via link 150. Application server system 111 is shown to include a memory 302, a processor 304, and a network interface 306. In a given implementation, memory 302 may represent multiple memories, and processor 304 may represent multiple processors. In an embodiment, the application server system 111 may include a number of software components that are stored in a computer-readable medium, such as memory 302, and are executable by processor 304. In this respect, the term "executable" includes a program file that is in a form that can be directly (e.g., machine code) or indirectly (e.g., source code that is to be compiled) performed by the processor 304. An executable program may be stored in any portion or component of memory 302.

Memory 302 is shown to include an operating system 308, a printer application container 310, data 312, and a recommendation service 314. Operating system 308 represents generally any software platform on top of which other programs or applications such as recommendation service 314 run. Examples include Linux® and Microsoft Windows®.

Printer application container 310 represents generally a container that holds printer applications to be accessed by web-enabled printers. In an embodiment, the printer application container 310 holds printer applications for downloading to, and execution at, a web-enabled printer 141. In an embodiment, the printer application container 310 holds printer applications that are executed at the application server system 111 in such a manner that a display of information and/or content is produced at a web-enabled printer 141 that is connected to the application server system 111 via link 150.

Data 312 represents generally a collection of information stored in memory 302, the information available to be utilized by recommendation service 314 to recommend a printer application. In an example, data 312 may include application data 316, printer capabilities data 318, and usage data 320. Application data 316 represents generally data relating to pertaining to a printer application, and may include directory data 322, personalized data 324, and third party data 326. Directory data 322 represents generally developer-supplied information regarding the printer application. Personalized data 324 represents generally user-supplied information regarding the printer application. Third party data 326 represents generally information regarding the printer application that is supplied by an entity other than a developer or user of the application. Printer capabilities data 318 represents generally data indicative of the capabilities of web-enabled printers, including web enabled printers 141 and 142.

Recommendation service 314 represents generally any programming, that, when executed, implements the functionality of the recommendation manager 200 of FIG. 2. In particular, recommendation service 314, when executed by processor 304, is responsible for obtaining, at application server system 111, first data pertaining to or relating to a software application accessible at web enabled printer 141. In an embodiment, obtaining the first comprises extracting developer-supplied metadata from a printer application stored at printer application container 310, or from a computer file that is associated with the printer application (e.g., a related XML file) stored as directory data 322. In an embodiment, the obtaining the first data comprises extracting information from content within the printer application that is stored at printer application container 310. In an embodiment, obtaining the first data comprises receiving data that is created by a user of the application, which data may be stored at personalized data 324. The first data may be obtained by extracting a user-created metadata tag from the application file or an associated file, or by accessing a lookup file that contains user-created metadata for a number of printer applications. In an embodiment, obtaining the first data comprises receiving data from a third party, e.g., a person or entity that is not a developer or a user of the application, which data may be stored at third party data 326. In an embodiment, first data pertaining to or relating to a software application accessible at web enabled printer 141 may be obtained from a computing device other than a web-enabled printer and that and stores data pertaining to the printer application.

Recommendation service 314 is additionally operable to receive, at the application server system 111, second data indicative of capabilities of web enabled printer 141. The second data may be received directly from the printer 141 via the web connection. In an embodiment, the second data may be obtained from a printer directory server 112 that is a computing device other than a web-enabled printer and that and stores data indicative of the capabilities of printers 141 and 142.

Recommendation service 314 is additionally responsible for receiving, at the application server system 111, third data comprising usage information. In an embodiment, the received third data is data indicative of usage of web-enabled printer 141 and may be received directly from first web-enabled printer 141. In an embodiment, the received third data is indicative of usage of a particular printer application at the first printer 141, or at a set of printers 142 that are the same model as the first printer. In an embodiment, the third data may be received from a server dedicated to tracking such usage. In an embodiment, the received usage information may be stored at application server system 111 in memory 302 as usage data 320. In an embodiment, the received third data is indicative of usage by a specific user. In embodiments, the received data is indicative of a specific type of content having been accessed, e.g., content accessed by a web-enabled printer 141, by a group of printers, by a specific or particular user, or by a group of users.

Recommendation service 314 is additionally responsible for creating an application recommendation based at least in part on the first, second, and third data. In one example, the received application data 316, printer capabilities data 318 and usage data 320 are utilized in creating the application recommendation. In an example, a query of usage data 320 may be conducted to identify a first set of printer applications most frequently accessed by a user at printer 141. Next, a query of the first set of printer applications is conducted to identify key attributes of regarding the type or content of the first set of applications. Next, a search of a printer application container 310 at the application server system 111 is conducted to identify a second set of applications with metadata indicating that the second set applications (a) have key attributes in common with the first set of printer applications, and (b) are compatible with the web enabled printer 141. Compatibility of the applications with web enabled printer 141 may be determined by comparing the requirements of the applications stored at printer application container 310 (e.g., color printing, duplexing, etc.) with the printer capabilities data 318 for printer 141 stored in memory 302 at server system 111. In other embodiments, queries may be run to search a database, at or external to application server system 111, for printer applications based upon criteria other than most frequent use at a particular printer. Search criteria may include usage of an application at a group of web enabled printers 142 that are of the same model as web enabled printer 141, usage of applications with a specific type of content, or usage of applications by a specific user.

Recommendation service 314 is additionally responsible for sending, from the server system and over a web, the recommendation to a receiving destination. In an embodiment the receiving destination is web enabled printer 141, or one of the other web enabled printers 142. In an embodiment, the receiving destination comprises a web site hosted by web server 113, the web site accessible to a computing device distinct from the printer. In the latter embodiment, a user may be presented with a printer application recommendation when the user logs on to the web site, or at another point during the user's visit to the site. In another embodiment, the application recommendation may be sent to a user via email.

Network Interface 306 represents generally any combination of hardware and programming configured for electronically connecting application server system 111 to link 150. In an embodiment, the network interface 306 may comprise a network interface card, a network adapter, a network interface controller, and or a LAN adapter.

Web-enabled printer 141 represents generally a computing device capable of accessing application server system 111, via link 150, to access a printer application. In an embodiment, the printer application is an application that runs at application server system 111 and is not downloaded to printer 141. In an embodiment. the application is an application that is downloaded to printer 141 from application server system 111, via the web, to be run at the printer 141. Web enabled printer 141 is additionally operable to produce printed output from the printer application, and communicating information relating to the application and/or the printed output back to the application server system 111. Web-enabled printer 141 is shown to include a print engine 328, a user interface 330, a display component 332, a network interface 334, and a controller 336. Print engine 328 represents generally any combination of hardware and programming capable of producing printed output from the subscribed-for content obtained from the application server system 111. In particular, print engine 328 utilizes imaging material such as ink or toner to form a desired image on a print medium.

User interface 330 represents generally any combination of hardware and programming that enables a user to enter commands at printer 141. In an embodiment, user interface 330 may be implemented through one or more physical buttons. Display component 332 represents generally any combination of hardware and programming that enables a user to receive information and/or communications at printer 141. In an embodiment, display component 332 may be implemented through a display screen to produce a visual display. In another embodiment, display component may include a speaker to additionally or alternatively provide an auditory display. An auditory display may incorporate speech and/or non-speech output. In an embodiment, user interface 330 and display component 332 are combined in the form of a touchscreen interface. In an example, user interface 330 and display component 332 may be a touchscreen device and include a combination of hardware and programming capable of presenting a visual display of content for viewing by a user and of receiving a request or other instructions from a user via the user's interaction, e.g., via a touch, with the touchscreen. In an embodiment, the user interface is a touch screen interface configured to display logos, which logos when selected initiate the execution of a printer application. Network interface 334 represents generally any combination of hardware and programming configured for electronically connecting web-enabled printer 141 to link 150.

As used in this example, controller 336 represents generally any combination of elements capable of acting as an embedded computing device to coordinate the operation of print engine 328, user interface 330, display component 332, and network interface 334. In a given implementation, the controller 336 includes a processor 338 and a memory 340. The processor 338 may represent multiple processors, and the memory 340 may represent multiple memories. Memory 340 may include printer capabilities data 342 and usage data 344 that can be retrieved by, or sent to, recommendation service 314 of the application server system 111, as is discussed in preceding paragraphs herein.

In the foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 4:
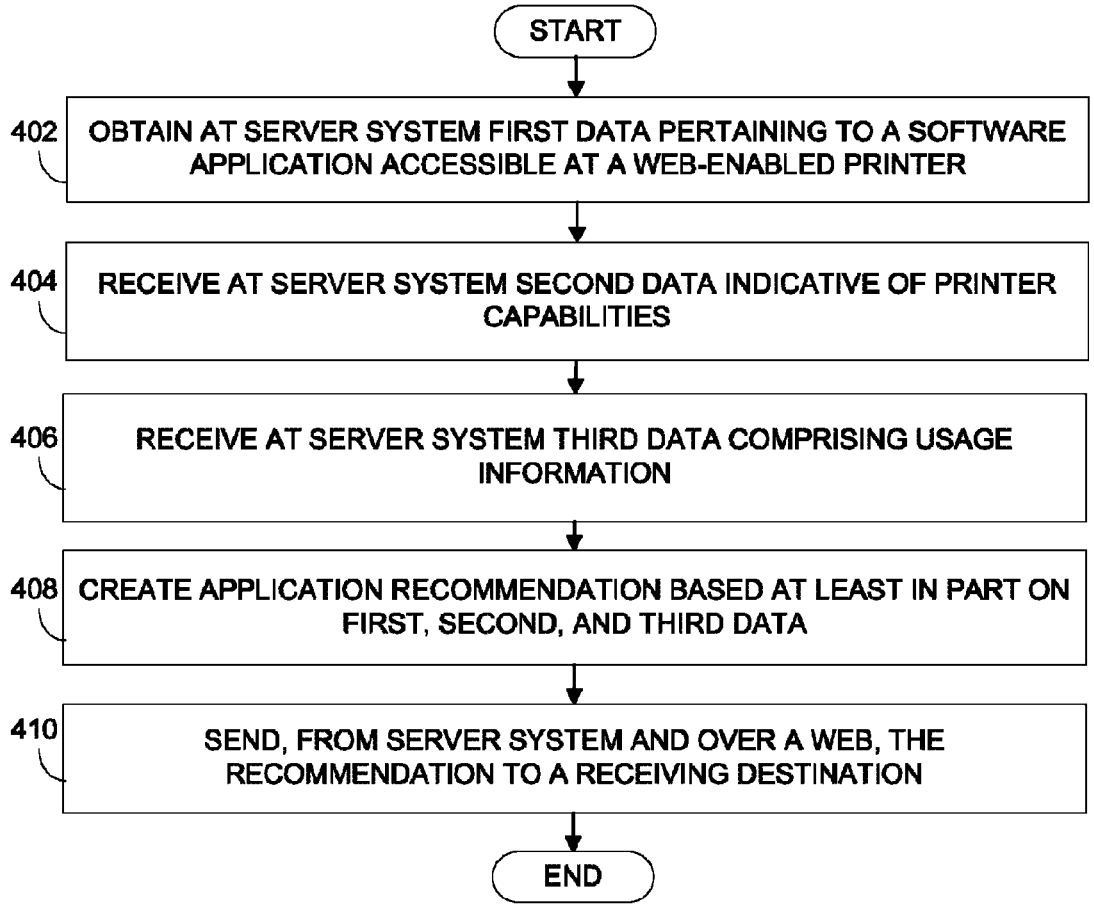
FIGS. 4 and 5 are example flow diagrams depicting embodiments of a method to recommend an application.
Figure 5:
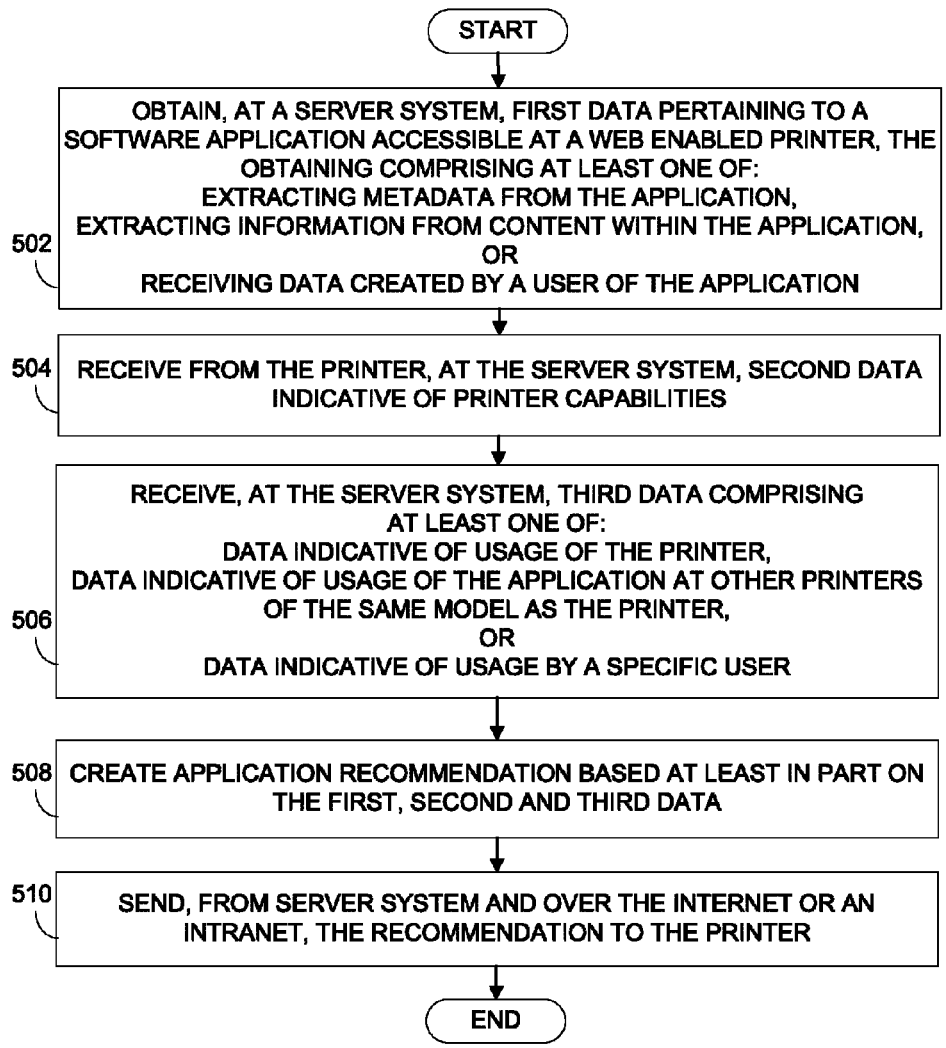

Operation:

FIGS. 4 and 5 are flow diagrams depicting example embodiments of a method to recommend an application. In discussing FIGS. 4 and 5, reference may be made to the diagrams of FIGS. 1-3 to provide contextual examples. Implementation, however, is not limited to those examples.

Starting with FIG. 4, first data is obtained at a server system, the first data pertaining to a software application that is accessible at a web-enabled printer (block 402). Referring back to FIG. 2, the application data module 202 may be responsible for implementing block 402.

Continuing with the flow diagram of FIG. 4, second data indicative of capabilities of the printer is received at the server system (block 404). Referring back to FIG. 2, the printer capabilities module 204 may be responsible for implementing block 404.

Continuing with the flow diagram of FIG. 4, third data comprising usage information is received at the server system, (block 406). Referring back to FIG. 2, the usage module 206 may be responsible for implementing block 406.

Continuing with the flow diagram of FIG. 4, an application recommendation is created based at least in part on the first, second, and third data (block 408). Referring back to FIG. 2, the creation module 208 may be responsible for implementing block 408.

Continuing with the flow diagram of FIG. 4, the recommendation is sent, from the server system and over a web, to a receiving destination (block 410). Referring back to FIG. 2, the delivery module 210 may be responsible for implementing block 410.

Moving on to FIG. 5, in a particular implementation, first data pertaining to a software application accessible at a web enabled printer is obtained at a server system. The obtaining includes at least one of extracting metadata from the application, extracting information from content within the application, or receiving data created by a user of the application (block 502). Referring back to FIG. 2, the application data module 202 may be responsible for implementing block 502.

Continuing with the flow diagram of FIG. 5, second data indicative of capabilities of the printer is received, from the printer, at the server system (block 504). Referring back to FIG. 2, the printer capabilities module 204 may be responsible for implementing block 504.

Continuing with the flow diagram of FIG. 5, third data is received at the printer, the third data comprising at least one of data indicative of usage of the printer, data indicative of usage of the application at other printers of the same model as the printer, or data indicative of usage by a specific user (block 506). Referring back to FIG. 2, the usage module 206 may be responsible for implementing block 506.

Continuing with the flow diagram of FIG. 5, an application recommendation is created based at least in part on the first, second, and third data (block 508). Referring back to FIG. 2, the creation module 208 may be responsible for implementing block 508.

Continuing with the flow diagram of FIG. 5, the recommendation is sent, from the server system and over the Internet or an intranet, to the printer (block 510). Referring back to FIG. 2, the delivery module 210 may be responsible for implementing block 510.

EXAMPLES

Figure 6:
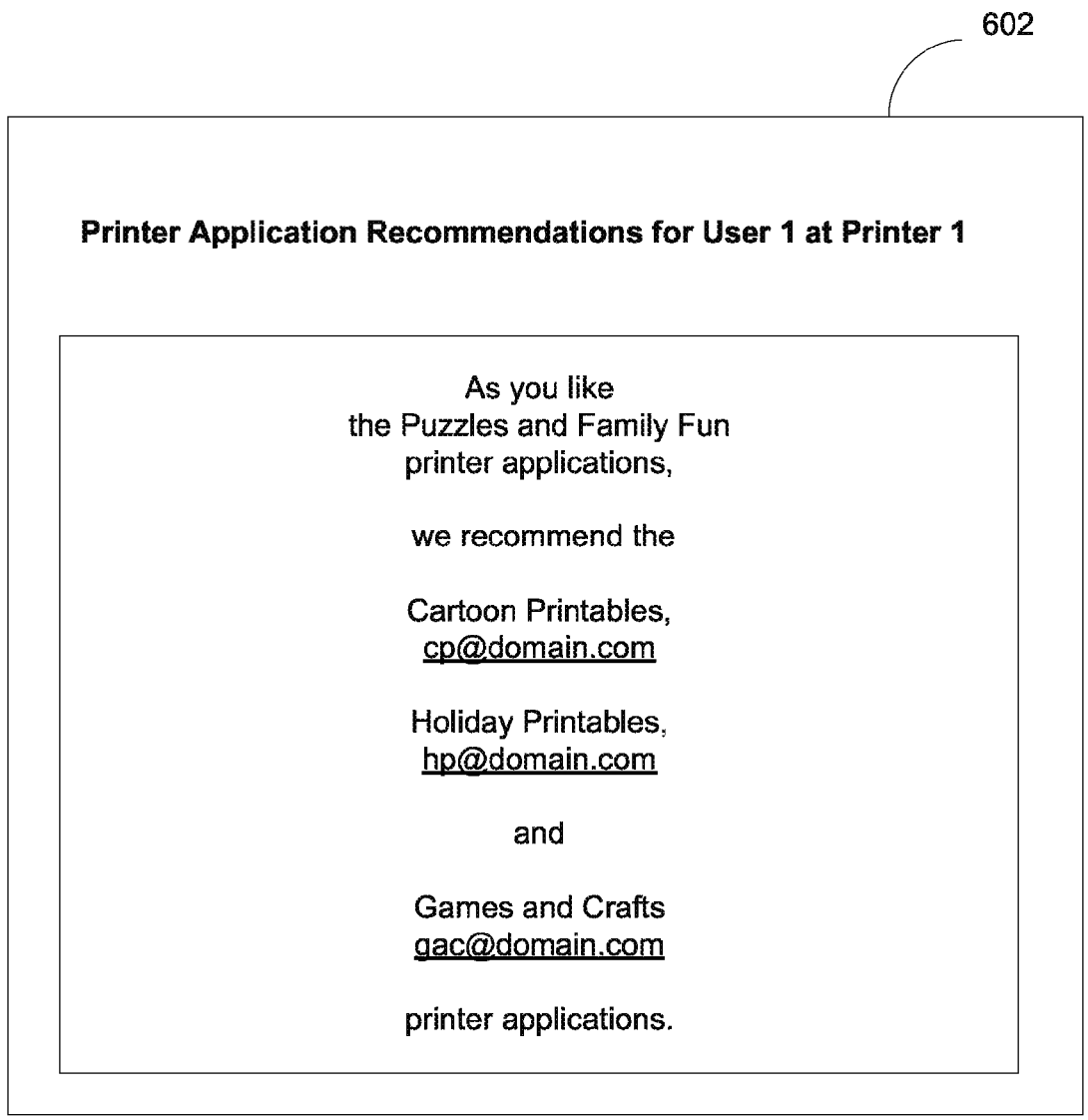
FIG. 6 is a screen shot depicting an example display utilized in recommending a printer application, according to an embodiment.

FIG. 6 is an example screen shot of a display 602 that may be presented to a user via user interface at a web enabled printer. In this example, the display 602 presents "User 1" with printer application recommendations at a web enabled Printer 1. The recommendations are created based at least in part upon first data, second, and third data that has been obtained or received at a server system. The obtained first data pertains to the "Puzzles" and "Family Fun" printer applications, and may include "Family" or "Entertainment" metadata tags created by the developer of the applications, by User 1, or by a third party. The second data is indicative of the capabilities of "Printer 1". In this example, such capabilities may include that Printer 1 is a color home/office printer. The third data comprises information regarding User 1's usage of Printer 1. In this example, such usage includes User 1's printing habits and preferences when printing at Printer 1. In this example, we assume that User 1 frequently prints at Printer 1 content from printer applications that are identified, by metadata tags or otherwise, as "Family" and "Entertainment" applications. Based at least in part on the first, second, and third data, the server system creates and sends to User 1 a recommendation to try the "Cartoon Printables", "Holiday Printables", and "Games and Crafts" printer applications. In one embodiment, the recommendation is sent once daily. In another embodiment, the recommendation is sent upon the server system's receipt of a request for recommendations, which request may be generated by a user "clicking on" a "request recommendations" icon or otherwise interacting with a user interface at the web enabled computing device.

In another embodiment, display 602 may additionally, or alternatively, may be presented to a user via a web site accessible to any web enabled computing device. In this embodiment, the server system may send the recommendation to a web site accessible to a computing device distinct from Printer 1. In this embodiment, a user's request for recommendations may be generated by the user clicking on an icon or otherwise interacting with a user interface at such computing device.

CONCLUSION

The diagram of FIG. 1 is used to depict an example environment in which various embodiments may be implemented. Implementation, however, is not so limited. FIGS. 2 and 3 show the architecture, functionality, and operation of various embodiments. Various components illustrated in FIGS. 2 and 3 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 4 and 5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A non-transitory computer readable medium storing computer executable instructions that when executed implement a method to recommend a software application available at a web-enabled printer, comprising:
   receiving, at a server system data indicative of capabilities of the printer;
   obtaining, at the server system, data descriptive of applications accessible at the printer;
   receiving, at the server system, data comprising usage information, including usage information of the applications accessible at the printer;
   generating a recommendation of a recommended application based at least in part on the application being accessible at the printer, and in part on similarity of printable content of the recommended application to printable content of frequently used applications as indicated by the descriptive data and the usage information; and
   sending, from the server system and over a web, the recommendation to a receiving destination.

2. The medium of claim 1, wherein obtaining the data descriptive of the applications accessible at the printer comprises extracting metadata from the applications.

3. The medium of claim 1, wherein obtaining the data descriptive of the applications accessible at the printer comprises receiving data created by a user of the applications.

4. The medium of claim 1, wherein obtaining the data descriptive of the applications accessible at the printer comprises extracting metadata from a computer file associated with the applications.

5. The medium of claim 1, wherein the data descriptive of the applications accessible at the printer comprises information extracted from printable content within the applications.

6. The medium of claim 1, wherein the data indicative of capabilities of the printer is received from the printer.

7. The medium of claim 1, wherein the data comprising usage information is indicative of usage of the printer.

8. The medium of claim 1, wherein the data comprising usage information is indicative of usage of the recommended application at other printers of the same model as the printer.

9. The medium of claim 1, wherein the data comprising usage information is indicative of accessing of a type of printable content.

10. The medium of claim 1, wherein the data comprising usage information is indicative of usage by a specific user.

11. The medium of claim 1, wherein the receiving destination comprises the printer.

12. The medium of claim 1, wherein the receiving destination comprises a web site accessible to a computing device distinct from the printer.

13. The medium of claim 1, wherein the recommended application is an application run at the server system.

14. The medium of claim 1, wherein the recommended application is an application run at the printer.

15. A system to recommend a software application available at a web-enabled printer, the system comprising:
  a processing resource in communication with a memory resource, wherein the memory resource includes a set of instructions and wherein the processing resource is designed to carry out the set of instructions wherein the set of instructions include:
  a printer capabilities module, configured to receive, at a server system, data indicative of capabilities of the printer;
  an application data module, configured to obtain, at the server system, data descriptive of applications accessible at the printer;
  a usage module, configured to receive, at the server system, data comprising usage information, including usage information of the applications accessible at the printer;
  a creation module, configured to generate a recommendation of a recommended application based at least in part on the application being accessible at the printer, and in part on similarity of printable content of the recommended application to printable content of frequently used applications as indicated by the descriptive data and the usage information; and
  a delivery module, configured to send, from the server system and over a web, the recommendation to a receiving destination.

16. The system of claim 15, wherein obtaining the data comprises extracting metadata from the applications or from a computer file associated with the applications.

17. The system of claim 15, wherein obtaining the data descriptive of the applications accessible at the printer comprises receiving data created by a user of the applications.

18. The system of claim 15, wherein the data comprising usage information is indicative of usage of a printer.

19. The system of claim 15, wherein the data comprising usage information is indicative of accessing of a type of printable content by a user.

20. A method to recommend a software application accessible at a web-enabled printer, comprising:
  receiving from the printer, at a server system, data indicative of capabilities of the printer;
  obtaining, at the server system, data descriptive of applications accessible at the printer, wherein obtaining comprises at least one of
    extracting metadata from the applications,
    extracting information from printable content within the applications, or
    receiving data created by users of the applications;
  receiving, at the server system, usage data comprising at least one of
    usage data indicative of usage of the printer,
    usage data indicative of usage of the applications accessible at the printer at other printers of the same model as the printer, or
    usage data indicative of usage by a specific user;
  generating a recommendation of a recommended application based at least in part on the application being accessible at the printer, and in part on similarity of printable content of the recommended application to printable content of frequently used applications as indicated by the descriptive data and the usage data; and
  sending, from the server system and over the Internet or an intranet, the recommendation to the printer.

* * * * *